July 21, 1925.  1,547,028

G. CAPRONI ET AL

CONSTRUCTION OF THE BEARING SURFACES FOR AEROPLANES

Filed Aug. 2, 1923    2 Sheets-Sheet 1

INVENTORS
GIANNI CAPRONI
UMBERTO NOBILE
RODOLFO VERDUZIO

BY *Munn & Co.*
ATTORNEYS

July 21, 1925. 1,547,028

G. CAPRONI ET AL

CONSTRUCTION OF THE BEARING SURFACES FOR AEROPLANES

Filed Aug. 2, 1923 2 Sheets-Sheet 2

INVENTORS
GIANNI CAPRONI
UMBERTO NOBILE
RODOLFO VERDUZIO

BY Munn & Co.
ATTORNEY

Patented July 21, 1925.

1,547,028

UNITED STATES PATENT OFFICE.

GIANNI CAPRONI, UMBERTO NOBILE, AND RODOLFO VERDUZIO, OF ROME, ITALY.

CONSTRUCTION OF THE BEARING SURFACES FOR AEROPLANES.

Application filed August 2, 1923. Serial No. 655,325.

*To all whom it may concern:*

Be it known that we, GIANNI CAPRONI, a subject of the King of Italy, and resident of Rome, in the Kingdom of Italy, UMBERTO NOBILE, a subject of the King of Italy, and resident of Rome, in the Kingdom of Italy, and RODOLFO VERDUZIO, a subject of the King of Italy, and resident of Rome, in the Kingdom of Italy, have invented certain new and useful Improvements in the Construction of the Bearing Surfaces for Aeroplanes, of which the following is a specification.

The present invention relates to improvements in the construction of the wing or bearing surfaces for aeroplanes, the object of said improvements consisting not only in rendering lighter the structure but also increasing the safety of same by causing all of the elements entering in the composition of the structure itself to contribute in increasing its resistance so that, in the case of one of them giving way, all of the other elements left uninjured continue sustaining the stresses.

This result is attained by forming the wing by means of a set of elements capable of resisting to compression or to tension, said elements suitably distributed over the upper and lower surface of the wing, and conveniently connected between each other so as to form an integral rigid system in such manner that all of the elements, including also the surface covering, contribute to resist the stresses which the structure is subjected to.

In the annexed drawing, which is intended to illustrate diagrammatically a practical embodiment of this invention, the figures from 1 to 5 and from 6 to 11 show the same wing structure formed of tubular elements and of fashioned elements, respectively, that is to say:

Throughout the figures the same reference characters are used to indicate corresponding parts.

Figure 1:
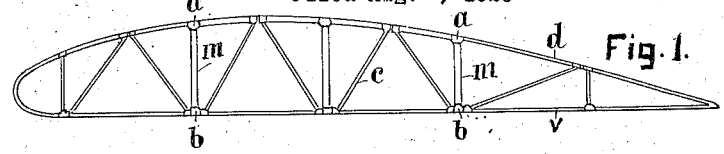
Fig. 1 is a vertical section of the wing along a plane parallel to the wing ribs.
Figure 2:
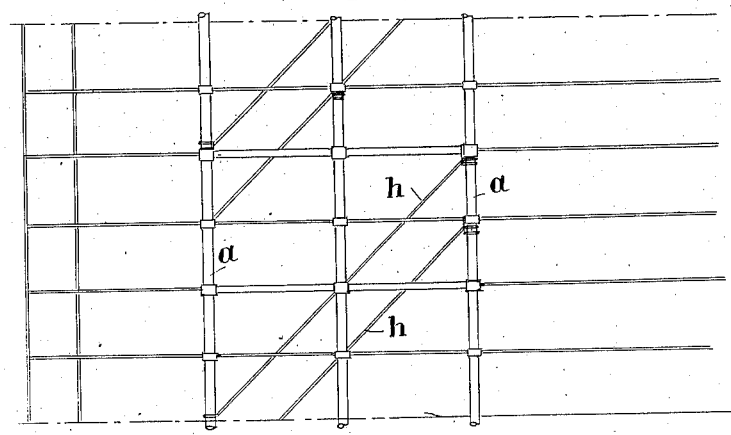
Fig. 2 is a top view of a portion of the wing.
Figure 3:
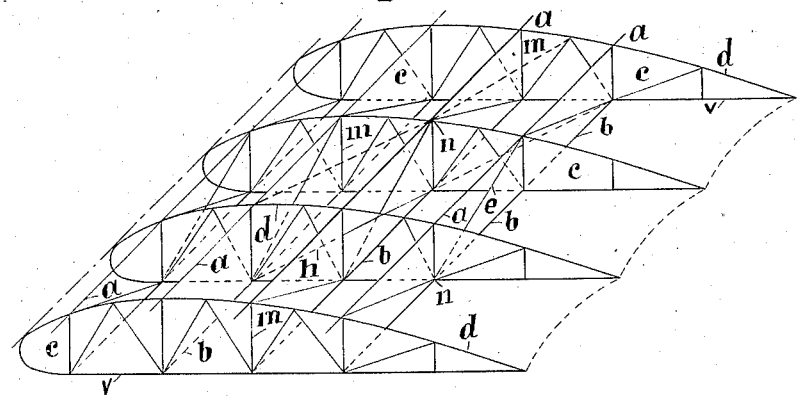
Fig. 3 is a perspective view of the structure, the external covering being omitted.

As it appears from the diagrammatical Figure 3, the structure is formed of elements of force $a$—$b$ arranged longitudinally like longitudinal members, but distributed over the lower and the upper surface of the wing so as to secure the greatest moment of resistance.

These elements of force are connected between each other by means of undeformable wing ribs arranged normally to them and preferably in such a way that every two elements $a$—$b$ superposed betwen each other come to lie in the vertical plane passing through corresponding struts —$m$— of the ribs —$c$— which thus are met by the elements $a$—$b$ in the knots —$n$— of their struts.

In some cases the shape of the wing may require that the ribs, instead of being placed parallel between each other, be arranged in converging planes or in planes otherwise inclined between themselves.

Diagonal elements —$h$— are intended to render undeformable the quadrangular meshes formed by the elements $a$—$b$ and by the dorsal and ventral elements $d$—$v$ of the ribs. The trapezoidal meshes $d$—$m$—$v$—$m$ of the ribs are in their turn rendered undeformable by diagonals —$e$—, and by diagonals —$e$— are rendered undeformable the rectangular meshes formed by two superposed elements $a$—$b$ and by the struts —$m$— of two successive ribs.

In this way is formed a light and at the same time strong and undeformable framework, in which all of the elements act in such a way as to contribute to the resistance of the whole system.

The material employed in this structure may be of different nature. The longitudinal elements $a$—$b$ may be of solid, hollow or compound wood, or even consist of steel tubes or fashioned steel duraluminium or of any other light metal.

In the figures from 1 to 5 these elements consist of tubes and that of tubular elements be formed the ribs as well as the horizontal and vertical diagonals —h— and —e—.

Figure 4:
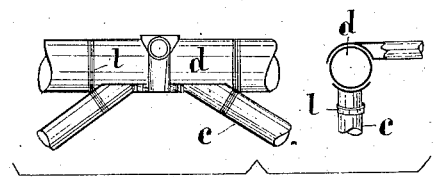
Figs. 4 and 5 are details showing the way of connecting the different elements.
Figure 5:
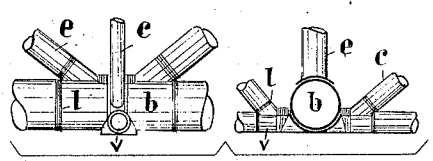
Figure 6:
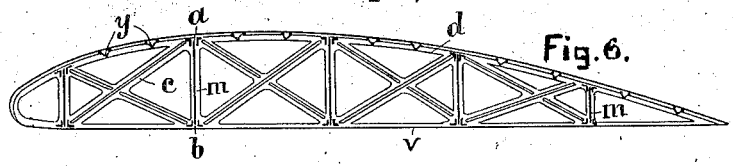
Fig. 6 is a vertical section of the wing along a plane parallel to the wing ribs.
Figure 7:
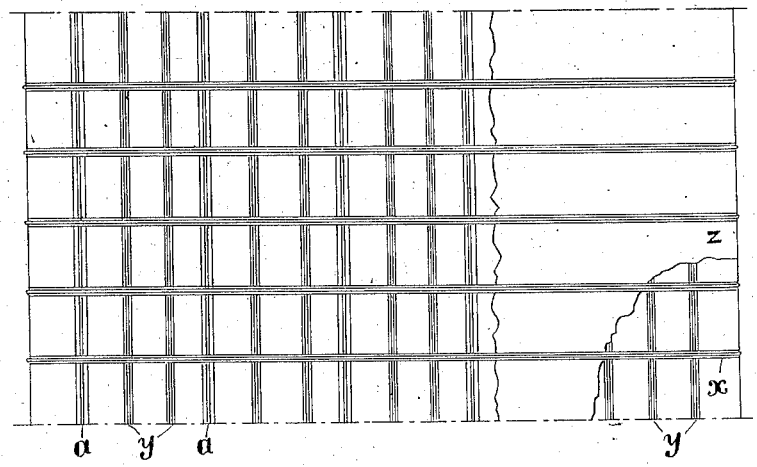
Fig. 7 is a top view of a portion of the wing.
Figure 10:
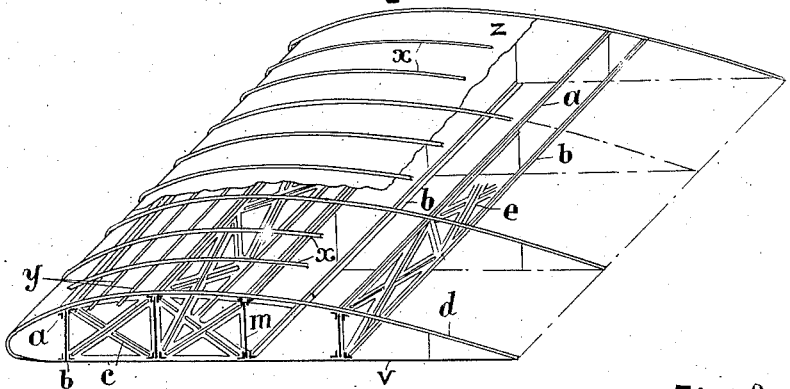
Fig. 10 is a perspective view of the structure, the external covering being partially omitted.

In this case the latticework tubes are connected to the main tubes by means of welded on wire ligatures —l— in the manner shown by way of example in Figs. 4 and 5 for some particular cases.

In the figures from 6 to 11 the longitudinal elements a—b are arranged in the same way as the ribs and consist of structural irons, and the latticework members are formed of light sheet metal.

Figure 8:
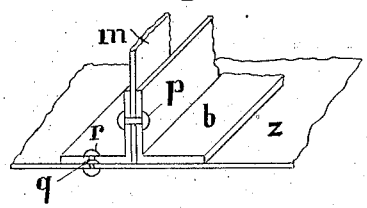
Figs. 8 and 9 are details showing the way of connecting the different elements.

In this case the connection of the various parts is performed by means of riveted joints —p—, as it is shown in Fig. 8.

It will be understood that other combinations of elements may be adopted for the purpose of forming an undeformable framework having the same features as the one disclosed, provided that the elements, which are to resist also to pressure or to bending, be maintained rigid by forming them of wood, metal tubes or fashioned bar iron, and that the diagonal elements, which are to resist only to tension, be formed of wire or metal cables.

Moreover to the resistance may be caused to contribute also the outer covering —z— of the framework, which in this case is preferably made of stiffened sheet metal with a double series of corrugations. One series of external corrugations —x— is arranged according to the direction of the stream lines, that is parallel to the planes of the wing ribs and a series of internal corrugations —y— is arranged orthogonally to the first ones, that is parallel to the longitudinal elements a—b.

Figure 11:
Fig. 11 is a detail of the riveting.
Figure 9:
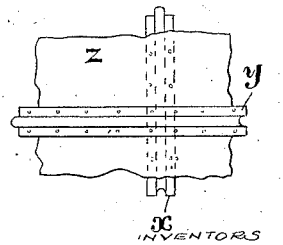

In this case, in order to facilitate the riveting of the sheet metal plate —z— on the ribs and on the longitudinal elements, are preferably used rivets —q— of the shape shown in Fig. 8 and as represented on an enlarged scale in Fig. 11. The rivets are previously fastened to the wings of the angle bars forming the elements —b—, as shown in the figure, and of the other elements a—v—d, to which the sheet metal plate is to be riveted. As it appears from the figures, the rivet is fixed on the angle bar by a head —r— closing inside and by a head countersunk outside, from which however projects a portion of the stem. In the sheet metal plate are previously prepared the holes for the passage of said stems, which are thereupon riveted from outside thus forming the heads —s— without being necessary to penetrate with tools or in any other way into the thickness of the wing.

It is obvious however that it would be sufficient to make use of these rivets, designed to connect the sheet metal plate, on only one of the faces of the wings, that is on the dorsal or on the ventral face, since, as long as the wing is open on one side, there is no difficulty of working inside the same.

Claims:

1. Structure for bearing surfaces of aeroplanes and the like, comprising in combination a set of longitudinal elements of force aranged near the dorsal and ventral face parallel to the two fore and rear edges; wing ribs composed of top and bottom members connected with lattice work inserted therebetween, and arranged normally or near normally to said elements of force, that is with their planes preferably parallel to the direction of the stream lines; and diagonal elements stiffening and rendering indeformable the quadrangular meshes resulting at the dorsal and ventral face between the longitudinal elements and top and bottom member of the ribs as well as the vertical quadrangular meshes resulting between the upper and the corresponding lower longitudinal member and two adjoining ribs.

2. Structure for bearing surface of aeroplanes according to claim 1, characterized in that it is strengthened by a sheet metal covering provided with two series of stiffening corrugations, one series of external corrugations being arranged according to the direction of the stream lines, and another series of internal corrugations being arranged normally to the first ones, that is parallel to the longitudinal elements.

3. Structure for bearing surfaces of aeroplanes according to claim 1, characterized in that the longitudinal elements of force meet the wing ribs in the knots connecting the struts.

4. Structure according to claim 2, in which for fastening the sheet metal covering are employed rivets which are secured to the elements of the framework by means of a head closing inside and a head countersunk outside, from which is projecting outward a piece of stem which is caused to enter the holes already prepared on the sheet metal and is riveted from outside without being necessary to penetrate in the interior of the wing.

In testimony whereof we have affixed our signatures this 14th day of July, 1923.

GIANNI CAPRONI.
UMBERTO NOBILE.
RODOLFO VERDUZIO.

Witnesses:
LETTERN LABSUETTA,
WILHELM SCHMID.